United States Patent
Detournay et al.

(10) Patent No.: US 9,422,166 B2
(45) Date of Patent: *Aug. 23, 2016

(54) PROCESS FOR PRODUCING SODIUM BICARBONATE

(75) Inventors: Jean-Paul Detournay, Brussels (BE); Francis M. Coustry, Alsemberg (BE)

(73) Assignee: Solvay (Societe Anonyme), Brussels (BE)

(*) Notice: Subject to any disclaimer, the term of this patent is extended or adjusted under 35 U.S.C. 154(b) by 1389 days.

This patent is subject to a terminal disclaimer.

(21) Appl. No.: 12/811,663

(22) PCT Filed: Jan. 6, 2009

(86) PCT No.: PCT/EP2009/050082
§ 371 (c)(1),
(2), (4) Date: Jul. 2, 2010

(87) PCT Pub. No.: WO2009/087149
PCT Pub. Date: Jul. 16, 2009

(65) Prior Publication Data
US 2010/0284891 A1    Nov. 11, 2010

(30) Foreign Application Priority Data
Jan. 8, 2008  (EP) .................................. 08150105

(51) Int. Cl.
C01D 7/32    (2006.01)
C01D 7/12    (2006.01)
(Continued)

(52) U.S. Cl.
CPC .............. C01D 7/126 (2013.01); B01D 61/422 (2013.01); C01D 1/38 (2013.01); C01D 7/32 (2013.01)

(58) Field of Classification Search
CPC ......... B01D 61/422; C01D 7/126; C01D 7/34
USPC .................... 204/534, 537, 538, 631; 205/82; 423/206.2, 422, 427
See application file for complete search history.

(56) References Cited

U.S. PATENT DOCUMENTS 3,953,073 A * 4/1976 Kube .......................... 423/206.2
4,044,097 A * 8/1977 Gancy et al. ................ 423/206.2
(Continued)

FOREIGN PATENT DOCUMENTS

CA    2009616 A1    8/1991
EP     439636 A1    1/1990
(Continued)

OTHER PUBLICATIONS

U.S. Appl. No. 12/811,643, filed Jul. 2, 2010, Jean-Paul Detournay et al.
(Continued)

*Primary Examiner* — Steven A. Friday
(74) *Attorney, Agent, or Firm* — Beatrice C. Ortego

(57) ABSTRACT

In a process to produce sodium carbonate, a first production solution comprising sodium carbonate is introduced into less basic compartments of an electrodialyzer comprising alternating less basic and more basic adjacent compartments separated from each other by cationic membranes, the more basic compartments being delimited by anionic faces of bipolar membranes on one side and by the cationic membranes on the other side; a second production solution comprising sodium carbonate is introduced into the more basic compartments of the electrodialyzer; a solution comprising sodium hydroxide is produced into the more basic compartments by combination of sodium ions flux sodium ions crossing the cationic membrane and hydroxyl ions flux crossing the anionic face of the bipolar membranes, and is then extracted from the electrodialyzer to be used as a reaction solution; and the reaction solution is reacted with sodium bicarbonate in order to form a produced solution comprising sodium carbonate.

12 Claims, 1 Drawing Sheet

(51) Int. Cl.
    *B01D 61/42*    (2006.01)
    *C01D 1/38*    (2006.01)

(56) References Cited

U.S. PATENT DOCUMENTS

| | | | |
|---|---|---|---|
| 4,238,305 A | | 12/1980 | Gancy et al. |
| 4,584,077 A | | 4/1986 | Chlanda et al. |
| 4,636,289 A | | 1/1987 | Mani et al. |
| 5,308,455 A | * | 5/1994 | Bourgeois .................... 205/344 |
| 6,221,225 B1 | | 4/2001 | Mani |
| 6,924,318 B2 | | 8/2005 | Mischi et al. |
| 2009/0288957 A1 | | 11/2009 | Detournay et al. |

FOREIGN PATENT DOCUMENTS

| | | |
|---|---|---|
| WO | WO 01/79335 A1 | 10/2001 |
| WO | WO 2008/003787 A1 | 1/2008 |
| WO | WO 2009/087143 A1 | 7/2009 |
| WO | WO 2009/087145 A1 | 7/2009 |

OTHER PUBLICATIONS

U.S. Appl. No. 12/811,639, filed Jul. 2, 2010, Jean-Paul Detournay et al.

U.S. Appl. No. 12/305,444, filed Dec. 18, 2008, Jean-Paul Detournay et al.

* cited by examiner

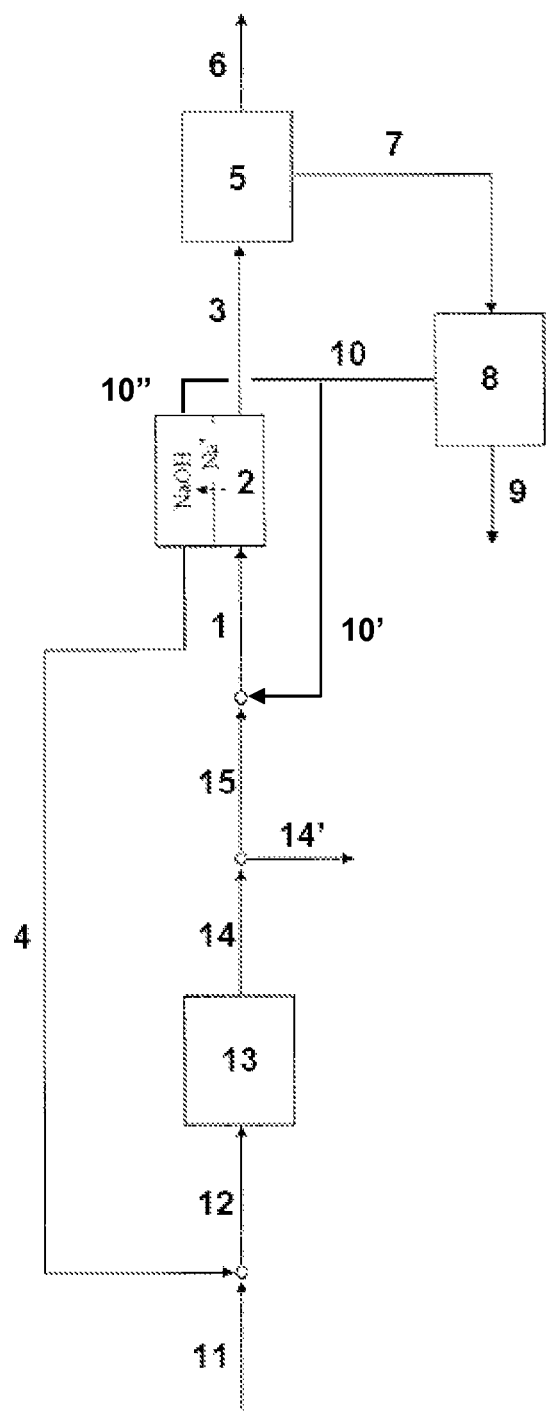

PROCESS FOR PRODUCING SODIUM BICARBONATE

CROSS-REFERENCE TO RELATED APPLICATIONS

The present application is a U.S. national stage application under 35 U.S.C. §371 of International Application No. PCT/EP2009/050082 filed Jan. 6, 2009, which claims the priority benefit of European Application No. 08150105.8 filed Jan. 8, 2008, the whole content of such application being incorporated herein by reference for all purposes.

TECHNICAL FIELD OF THE INVENTION

This invention relates to a process for producing sodium carbonate, in particular from an ore mineral comprising sodium bicarbonate, such as trona, nahcolite or other mineral underground ores, rich in sodium bicarbonate values, such as Wegscheiderite or Decemite.

BACKGROUND OF THE INVENTION

Nahcolite is an ore consisting primarily of sodium bicarbonate. There are for instance vast quantities of nahcolite in the Piceance Creek Basin in Northwestern Colorado, which deposits are in the form of beds and disseminated crystals in the Saline Zone of the Green River formation.

Trona ore is a mineral that contains about 90-95% sodium sesquicarbonate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl). By conservative estimates, the major trona beds contain about 75 billion metric tons of ore. A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate is one of the largest volume alkali commodities made in the United States. In 1992, trona-based sodium carbonate from Wyoming comprised about 90% of the total U.S. soda ash production. Sodium carbonate finds major use in the glass-making industry and for the production of baking soda, detergents and paper products.

A common method to produce sodium carbonate from trona ore is known as the "monohydrate process". In that process, crushed trona ore is calcined (i.e., heated) in order to convert the bicarbonate part of the trona into crude sodium carbonate which is then dissolved in water. The resulting water solution is purified and fed to a crystallizer where pure sodium carbonate monohydrate crystals are crystallized. The monohydrate crystals are separated from the mother liquor and then dried into anhydrous sodium carbonate. This process is however very energy intensive, mainly due to the calcination step, which requires the use of large quantities of coal, fuel, gas or mixtures thereof.

Attempts to reduce the energy consumption for the production of sodium carbonate have been made, by the use of electrodialytic methods. U.S. Pat. No. 4,238,305 discloses a method for recovering sodium carbonate from trona and other mixtures of sodium carbonate and sodium bicarbonate. In U.S. Pat. No. 4,238,305, sodium hydroxide is introduced into the basic compartments of an electrodialyser and soda solutions such as trona or nahcolite solutions are introduced into the acid compartments. An enriched sodium hydroxide solution is extracted from the electrodialyser. The sodium hydroxide solution is finally reacted with carbon dioxide to produce sodium carbonate. However, this process has proven to be complex to operate, in part due to the high pH in the basic compartment.

SUMMARY OF THE INVENTION

The invention aims at producing sodium carbonate in particular out of mineral ores comprising sodium bicarbonate in a simple, economical way, avoiding the large energy consumption or complexity of the known processes.

In consequence, the invention concerns a process to produce sodium carbonate according to which:
- a first production solution comprising sodium carbonate is introduced into the less basic compartments of an electrodialyser comprising alternating less basic and more basic adjacent compartments separated from each other by cationic membranes, the more basic compartments being delimited by the anionic faces of bipolar membranes on one side and by the cationic membranes on the other side;
- a second production solution comprising sodium carbonate is introduced into the more basic compartments of the electrodialyser;
- a solution comprising sodium hydroxide is produced into the more basic compartments, by combination of the flux of sodium ions crossing the cationic membrane and the flux of hydroxyl ions crossing the anionic face of the bipolar membranes;
- the solution comprising sodium hydroxide is extracted from the more basic compartments of the electrodialyser and used to constitute a reaction solution;
- the reaction solution is reacted with sodium bicarbonate in order to form a produced solution comprising sodium carbonate;

BRIEF DESCRIPTION OF THE DRAWINGS

FIG. 1 illustrates one particular embodiment of a process according to the invention.

DETAILED DESCRIPTION

In the process according to the invention, the electrodialyser contains at least two types of compartments and two types of membranes, cationic and bipolar. In some embodiments it can contain additional types of compartments and anionic membranes.

A bipolar membrane is an ion exchange membrane comprising one cationic face—permeable for the cations and impermeable for the anions and an other anionic face—permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. It is recommended that the bipolar membranes are produced by the process as described in the patent application WO 01/79335 in the name of SOLVAY, in particular as described in its claims.

In a preferred embodiment of the process, the electrodialyser comprises only two types of compartments and only cationic and bipolar membranes. In this embodiment, wherein the less basic and more basic compartments of the electrodialyser are separated by an alternation of cationic and bipolar membranes, each compartment is thus delimited on one side by a cationic membrane, and on the other side by a bipolar membrane.

In the process according to the invention, the reaction solution comprising sodium hydroxide reacts with sodium bicarbonate in order to form a produced solution comprising sodium carbonate. This reaction with sodium bicarbonate can be performed in different ways and with sodium bicarbonate having different origins and compositions.

In a first embodiment of the invention, the reaction solution is reacted with sodium bicarbonate by mixing it with a solution comprising sodium bicarbonate already at hand, in order to convert at least part of the sodium bicarbonate into sodium carbonate. This embodiment allows to take advantage of diluted sodium bicarbonate solutions, by converting them into more concentrated sodium carbonate solutions, easily valorized.

In a second embodiment of the invention, which is particularly advantageous, the reaction solution is reacted with sodium bicarbonate by putting it in contact with a mineral ore comprising sodium bicarbonate. The resulting sodium carbonate, thanks to its high solubility, is easily solubilized from the ore, which allows to extract efficiently the soda values from the mineral ore. Different mineral ores can be utilized and the mineral ores can be put into contact with the reaction solution in very different ways, for instance in surface equipments using excavated mineral ores. It is however particularly interesting to introduce the reaction solution underground and put it into contact with subterranean mineral ore deposits. The solution comprising sodium carbonate is then formed underground and extracted by conventional solution mining techniques. This embodiment is suited to Trona, Nahcolite, Wegscheiderite or Decemite mineral underground ores. In a particularly preferred embodiment, the mineral ore comprising sodium bicarbonate is an underground trona or nahcolite ore mineral.

It is recommended that the reaction solution comprises at most 120 g/kg, preferably at most 100 g/kg sodium hydroxide and at most 40 g/kg preferably 35 g/kg sodium carbonate. It is nevertheless preferable that the reaction solution comprises at least 40 g/kg, more preferably 50 g/kg sodium hydroxide.

Usually, the reaction solution will be made by mixing the solution comprising sodium hydroxide which is extracted from the more basic compartments with fresh water or recycle waters, in order to dilute it.

Alternatively, the solution comprising sodium hydroxide can be advantageously used as such to form the reaction solution and reacted directly with the sodium bicarbonate. Depending on the particular circumstances, the output from the more basic compartments will have to be reintroduced in their input, in order to get the best sodium hydroxide concentration.

The control of the composition of the reaction solution allows to regulate the composition of the produced solution. It is advantageous that the produced solution comprises advantageously at least 200 g/kg, preferably 250 g/kg sodium carbonate.

In a recommended embodiment of the process according to the invention, at least part of the produced solution is evaporated in order to produce a suspension comprising sodium carbonate crystals, which are separated and valorized. The evaporation can be made as in the monohydrate process, preferably by using mechanical vapor recompression. The sodium carbonate monohydrate crystals are then preferably processed into dense soda ash.

In the process according to the invention, a first production solution comprising sodium carbonate is introduced into the less basic compartments of the electrodialyser. Due to the flux of $Na^+$ ions through the cationic membrane and an incoming flux of $H^+$ ions, at least part of the entering sodium carbonate is transformed into sodium bicarbonate, forming an output solution comprising sodium bicarbonate. Depending on the concentration in sodium carbonate of the first production solution, it can also happen, in advantageous embodiments, that sodium bicarbonate is converted into carbon dioxide at the output of the less basic compartments of the cell. Indeed, when all the sodium carbonate entering the less basic compartments has been transformed into sodium bicarbonate as a consequence of $Na^+$ ions passing the cationic membranes, any additional flux of $Na^+$ ions passing through those membranes has the consequence of destroying sodium bicarbonate into $CO_2$ and water. The carbon dioxide can then be reacted with sodium carbonate solutions at other stages of the process in order to produce crystals of sodium bicarbonate. For instance, the generated $CO_2$ gas can advantageously be used to react with part of the sodium carbonate solution produced through the contact of the reaction solution with the mineral ores, in order to produce sodium bicarbonate crystals. This reaction can be performed in gas—liquid contactors suitable for the carbonation of sodium carbonate solutions. Depending on the circumstances, the sodium carbonate solution can be first concentrated by any suitable means, before its carbonation.

A second production solution comprising sodium carbonate is introduced into the more basic compartments of the electrodialyser. This solution can be the same as the first production solution. However it will usually have different concentrations in sodium carbonate/sodium bicarbonate.

In order to produce a solution comprising sodium hydroxide into the more basic compartments of the electrodialyser, it is necessary to limit the flux of sodium bicarbonate which could be introduced into those compartments. In fact, the maximum flux of $HCO^{3-}$ ions entering into the more basic compartments is limited by the flux of $OH^-$ ions and $Na^+$ ions introduced into them through the bipolar and cationic membranes. The more basic compartments can be advantageously fed by a diluted sodium carbonate solution, containing advantageously at least 10 g/kg preferably 20 g/kg, more preferably 30 g/kg, most preferably 40 g/kg sodium carbonate, but at most 100 g/kg, preferably at most 80 g/kg sodium carbonate.

In a particularly advantageous and simple embodiment, part of the produced solution comprising sodium carbonate is used in order to constitute the first and/or second production solutions. The produced solution can be used as such. Alternatively it will generally have to be diluted and/or mixed with other streams in order to constitute the production solutions.

In a recommended embodiment of the process, a solution comprising sodium bicarbonate is extracted from the less basic compartments of the electrodialyser, this solution being afterwards cooled in order to produce a suspension comprising sodium bicarbonate crystals. The suspension is separated into sodium bicarbonate crystals to be valorized and a sodium bicarbonate mother liquor. The mother liquor is then preferably debicarbonated, in order to produce on one side a gas comprising $CO_2$ and on the other side a debicarbonated solution depleted in sodium bicarbonate and enriched in sodium carbonate. The debicarbonated solution can be mixed with the first and/or second production solutions and introduced into the electrodialyser. It can also be mixed with the produced solution in order to form the reaction solution. The debicarbonation can be performed by vapor or preferably by air stripping.

The process according to the invention can be run with only one electrodialyser. It is however possible to use several electrodialysers, the output from some of them being used as input for others.

For instance, in a recommended embodiment of the process according to the invention, the solution comprising sodium bicarbonate which is extracted from the less basic compartments of the electrodialyser is introduced into the less basic compartments of another electrodialyser. In this embodiment, it is preferable first to cool the solution comprising sodium bicarbonate extracted from the less basic compartments of the first electrodialyser and separate the sodium bicarbonate crystals which appears due to the cooling. The mother liquor is then introduced into the other electrodialyser. Additionally, in this embodiment, it is recommended that the concentration in sodium carbonate of the solution comprising sodium bicarbonate which is introduced into the other electrodialyser is sufficiently low so as to generate $CO_2$ gas into the less basic compartments of this other electrodialyser.

The annexed FIG. 1 illustrates a particular embodiment of the invention. A production solution 1 comprising sodium carbonate is introduced into the less basic compartments of an electrodialyser 2 comprising alternating less basic and more basic compartments. A solution 3 comprising sodium bicarbonate is extracted from the less basic compartments and a solution 4 comprising sodium hydroxide is extracted from the more basic compartments of the electrodialyser. The solution 3 is cooled in the crystallizer 5, resulting in sodium bicarbonate crystals 6 and a mother liquor 7. The mother liquor 7 is debicarbonated by air stripping in the contactor 8, resulting in $CO_2$ gas 9 and debicarbonated mother liquor 10, a part 10'' of which is sent back to the more basic compartments of the electrodialyser 2. Fresh water 11 is mixed with the solution 4 comprising sodium hydroxide, to form the reaction solution 12. The reaction solution 12 is injected into a subterranean trona mine 13. A solution 14 comprising sodium carbonate is extracted from the trona mine. A produced solution 14' is taken out of this solution 14 and sent to an evaporator (not represented), wherein sodium carbonate monohydrate crystals are formed. Those crystals are thereafter valorized, for instance by transformation into dense soda ash. The remaining part 15 of the solution 14 is sent to the electrodialyser 2, constituting, after mixing with part 10' of the debicarbonated mother liquor 10 the production solution 1.

Details and particularities of the invention will appear from the description of the following example.

EXAMPLE

The process according to a particular embodiment of the invention is operated in the following way. A quantity of 0.024 m³/h of a production solution comprising 110 g/kg sodium carbonate and 32 g/kg sodium bicarbonate is introduced at a temperature of 29° C. into the less basic compartments of an electrodialyser. The electrodialyser comprise bipolar membranes produced by ASTOM, model NEOSEPTA BP-1E and cationic membranes NAFION® 324, produced by DuPont. The electrodialyser anode is in titanium coated with a $TiO_2/RuO_2$ (50%/50%) layer. The cathode is in platinated titanium. A current density of 1 kA/m² is applied to the elementary cell. A solution comprising 117 g/kg sodium bicarbonate and 20 g/kg sodium carbonate at a temperature of 65° C. is extracted from the less basic compartments of the electrodialyser at a flow rate 0.023 m³/h. This solution is cooled to 30° C. in a crystallizer, resulting in a production of 0.78 kg/h of sodium bicarbonate crystals. The mother liquor is debicarbonated, resulting in a solution comprising 50 g/kg sodium carbonate and 43 g/kg sodium bicarbonate. A flow rate of 0.003 m³/h of this debicarbonated solution is introduced into the more basic compartments of the electrodialyser, together with 0.007 m³/h water. A solution comprising 27 g/kg sodium carbonate and 70 g/kg sodium hydroxide is extracted from the more basic compartments and introduced at a temperature of 50° C. into a trona mine comprising trona ore having the composition described in the introductory part of this specification, the temperature of the ore being approximately 25° C. A solution comprising 280 g/kg $Na_2CO_3$ is extracted from the mine at a flow rate of 0.014 m³/h and a temperature of approximately 30° C. A part of 0.008 m³/h is subtracted from this solution for evaporation and sodium carbonate crystallization.

The remaining flow is used to constitute the production solution, after mixing with a flow of 0.02 m³/h of debicarbonated mother liquor.

The invention claimed is:

1. A process to produce sodium carbonate, comprising:
   introducing a first production solution comprising sodium carbonate into less basic compartments of an electrodialyser comprising alternating less basic and more basic adjacent compartments separated from each other by cationic membranes, the more basic compartments being delimited by anionic faces of bipolar membranes on one side and by the cationic membranes on the other side;
   introducing a second production solution comprising sodium carbonate into the more basic compartments of the electrodialyser;
   producing a solution comprising sodium hydroxide into the more basic compartments, by combination of flux of sodium ions crossing the cationic membrane and flux of hydroxyl ions crossing the anionic face of the bipolar membranes;
   extracting the solution comprising sodium hydroxide from the more basic compartments of the electrodialyser and using such solution to constitute a reaction solution; and
   reacting the reaction solution with sodium bicarbonate in order to form a produced solution comprising sodium carbonate.

2. The process according to claim 1, wherein the reaction solution is reacted with sodium bicarbonate by putting said reaction solution into contact with a mineral ore comprising sodium bicarbonate.

3. The process according to claim 2, wherein the mineral ore comprising sodium bicarbonate is an underground trona or nahcolite ore mineral.

4. The process according to claim 1, wherein the reaction solution is reacted with sodium bicarbonate by mixing said reaction solution with a solution comprising sodium bicarbonate.

5. The process according to claim 1, wherein the produced solution is evaporated in order to produce a suspension comprising sodium carbonate crystals, which are separated and valorized.

6. The process according to claim 1, wherein part of the produced solution is used to constitute the first and/or second production solutions.

7. The process according to claim 1, wherein a solution comprising sodium bicarbonate is extracted from the less basic compartments of the electrodialyser, this sodium bicarbonate-comprising solution being afterwards cooled in order to produce a suspension comprising sodium bicarbonate crystals, and the suspension being separated into valorized sodium bicarbonate crystals and a sodium bicarbonate mother liquor.

8. The process according to claim 7, wherein the sodium bicarbonate mother liquor is debicarbonated and introduced into the less basic compartments of the electrodialyser.

9. The process according to claim 7, wherein the sodium bicarbonate mother liquor is debicarbonated and introduced into the more basic compartments of the electrodialyser.

10. The process according to claim 7 wherein the sodium bicarbonate mother liquor is introduced into the less basic compartments of another electrodialyser.

11. The process according to claim 10, wherein the concentration in sodium carbonate of the sodium bicarbonate mother liquor is sufficiently low so as to generate $CO_2$ gas into the less basic compartments of the other electrodialyser.

12. The process according to claim 11, wherein the generated $CO_2$ is put into contact with at least part of the produced solution comprising sodium carbonate, in order to produce sodium bicarbonate crystals.

* * * * *